United States Patent [19]

Girard et al.

[11] Patent Number: 5,351,207
[45] Date of Patent: Sep. 27, 1994

[54] METHODS AND APPARATUS FOR SUBTRACTION WITH 3:2 CARRY-SAVE ADDERS

[75] Inventors: Luke Girard, San Jose; Jonathan Sweedler, Sunnyvale, both of Calif.

[73] Assignee: Intel Corporation, Santa Clara, Calif.

[21] Appl. No.: 938,293

[22] Filed: Aug. 31, 1992

[51] Int. Cl.$^5$ .............................................. G06F 7/50
[52] U.S. Cl. ............................................................ 364/786
[58] Field of Search ............................................ 364/786

[56] References Cited

U.S. PATENT DOCUMENTS

| | | | |
|---|---|---|---|
| 3,976,866 | 8/1976 | Motegi et al. | 364/786 |
| 4,110,832 | 8/1978 | Leininger et al. | 364/786 |
| 4,888,723 | 12/1984 | Man et al. | 364/786 |

OTHER PUBLICATIONS

Computer Arithmetic, Principles, Architecture, and Design, pp. 98–102, John Wiley & Sons, 1979, Hwang.

*Primary Examiner*—David H. Malzahn
*Attorney, Agent, or Firm*—Blakely, Sokoloff, Taylor & Zafman

[57] ABSTRACT

A hardware logic arrangement for subtraction using a 3:2 carry-save-adder (CSA) for use with high speed floating point computation circuits. Three operands to be combined are routed to the three inputs of the CSA via separate multiplexors (MUXs) and appropriate inverting logic. Output sum and carry vectors are routed via further MUXs to separate latch storage registers. Subtraction executed as addition of the inverse of an operand is implemented by routing a constant "1" to the MUX steering the output carry vector to its associated latch.

16 Claims, 5 Drawing Sheets

|  |  |  |  |
|---|---|---|---|
| A |  |  | 1011 |
| + B |  | + | 0110 |
| + F* | => | + | 1010 |
| Result |  |  |  |
|  | Sum |  | 0111 |
|  | Carry | 1 | 0101  ~ (Signal 28) |
|  | Result | 1 | 1100 |

(Carry Out) ←

*Figure 5*

METHODS AND APPARATUS FOR SUBTRACTION WITH 3:2 CARRY-SAVE ADDERS

BACKGROUND OF THE INVENTION

1. Field of the Invention

The present invention relates to electronic digital information processing systems, and more particularly relates to a microarchitecture for integrated circuit logic elements implementing arithmetic functions.

2. Art Background

A common method of improving speed of a computer system is to employ a math processor, separate from the main processor, for performing floating point mathematical calculations. The combination main processor and math processor provides greatly increased speed of system operation, since math processors are optimized for performing floating point mathematical calculations, and since the burden of performing such calculations is lifted from the main processor.

When designing integrated circuit hardware for implementing digital information processing operations, circuit designers generally seek to minimize layout area required to implement a particular digital function, while delivering the desired result as quickly as possible. Accordingly, circuit size and operational speed are of paramount concern in any digital circuit design. The foregoing is all the more crucial when designing hardware implementing arithmetic functions, principally because most mathematical functions require repetitive or iterative execution of operations to reach a desired result. In addition, floating point numbers have more bits than integer numbers and are comprised of several bit fields. Thus, similar operations on integer and floating point numbers are more time consuming for the floating point numbers.

Two commonly encountered hardware components in digital arithmetic circuit arrangements are regular carry-propagate adders (CPAs) and carry-save-adders (CSAs). CPAs are designed to receive two inputs for the datavalues to be added. The CPA further has one output, commonly denominated "sum". The CPA operates according to well known principles wherein addend bits of the same order are added together, and a carry bit transferred to the next higher order bit when required. The final sum is directly derived from a bit-by-bit addition with the appropriate carry to the next higher order bit, with a single bit carry out from the highest order bit position. The ripple carry of the CPA results in slow non parallel operation since higher order bits are dependent on low order bit results.

CSAs on the other hand have three inputs designed to receive three numbers to be added, and has two outputs, "sum" and "carry". In CSAs, carry bits are accumulated separately from the sum bits of any given order (position), the output of the CSA being two vectors, namely sum and carry, which when added together yield the final result. The benefit of a CSA is that higher order bits have no dependency on any lower order bit because all bit positions are calculated independently, thereby avoiding any propagation latency of carry bits as in regular adders. This enables addition of three numbers using only one time consuming CPA. Without a CSA, two CPAs would be required. Because of their speed and simplicity, CSAs are pervasively found in digital logic designs, although other adder designs are feasible and implemented when necessary to provide a desired function. However, such functionality may be achieved at the expense of a larger circuit layout area, slower circuit operational speed, and reduced margin in producing the output result.

In particular, it may be occasionally desirable to add more than two numbers in the same clock cycle. Alternatively, it may be desirable to add two numbers and also subtract a third number in the same clock cycle. Although the addition of three numbers can be accommodated by a prior art standard design of 3:2 CSA, subtraction of one number in combination with addition of two other numbers poses a more difficult problem. Principally, adders are commonly invoked, whereas subtraction circuits are rarely designed. Instead, the most common solution to implement subtraction is to invoke addition of a 2's complement datavalue, which may be accomplished in an adder circuit arrangement. As is generally known, a 2's complement representation of any binary value may be derived by inverting a given number to its 1's complement equivalent, and thereafter adding one. The 2's complement number may then be added to another number, thereby invoking the subtraction operation within an adder hardware implementation.

Hardware implementations to achieve subtraction in combination with the addition of more than two datavalues could be produced by extending the size and complexity adder circuitry. For example, one prior implementation employs a 3:2 CSA to add the three datavalues, and a carry propagate adder (CPA) coupled to combine sum and carry outputs of the 3:2 CSA. A "carry in" input to the CPA completes the 2's complement addition if one of the 3:2 CSA inputs is inverted. However, the associated increase in operational speed and size of the such extra circuitry would likely pose serious performance handicaps in high performance high frequency designs, especially when the sum need only be maintained in CSA form (as a sum and a carry vector).

Accordingly, and as will be explained in more detail in the following paragraphs, subtraction operations can be readily implemented in the particular case of the 3:2 CSA by postponing the addition of the constant "1" in the case of 2's compliment addition until after all bits have been added in the 3:2 CSA. By taking advantage of the least significant bit position in the carry output vector, a carry-in operation can be accomplished such that three datavalues may be presented to the input of the CSA without requiring one of the data inputs to be reserved to receive the constant "1" and without employing a subsequent CPA.

SUMMARY OF THE INVENTION

A hardware implementation to permit subtraction using a 3:2 carry-save-adder (CSA) is disclosed. A 3:2 CSA of ordinary design having appropriate datapath widths is provided having three inputs receiving three datavalues. One of the inputs is designated to receive a 1's complement representation of datavalue which is to be subtracted from the sum of datavalues delivered to the two remaining inputs via appropriate steering and inversion logic. Sum and carry output vectors are latched into registers in a known manner. A constant "1" signal is accommodated by routing appropriate control signals through appropriate logic to generate a carry bit signal when the datavalue presented to the third input is to be subtracted. The addition of the constant "1" is accomplished by shifting in a binary value of 1 into the lowest order, or least significant, bit location of the output carry vector. Because the least significant bit position of the output carry vector is never used during formation of the output carry vector result, the least significant bit position of the carry vector may be essentially "reserved" for use as the dedicated carry-in input. Accordingly, addition of the 2's complement, i.e. subtraction, may be invoked on the 3:2 CSA where all three inputs accommodate datavalues, and where no other inputs remain for the carry-in signals.

BRIEF DESCRIPTION OF THE DRAWINGS

The present invention will be understood more fully from the detailed description given below and from the accompanying drawings of the preferred embodiment of the invention in which:

FIG. 5 illustrates subtraction via addition of a 2's complement datavalue using the attributes of the present invention with a 3:2 CSA.

DETAILED DESCRIPTION OF THE INVENTION

A digital logic design implementing subtraction with a 3:2 carry-save-adder (CSA) in a high speed Floating Point Unit (FPU), is disclosed. In the following description, for purposes of explanation, specific numbers, times, signals, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily.

Figure 1:
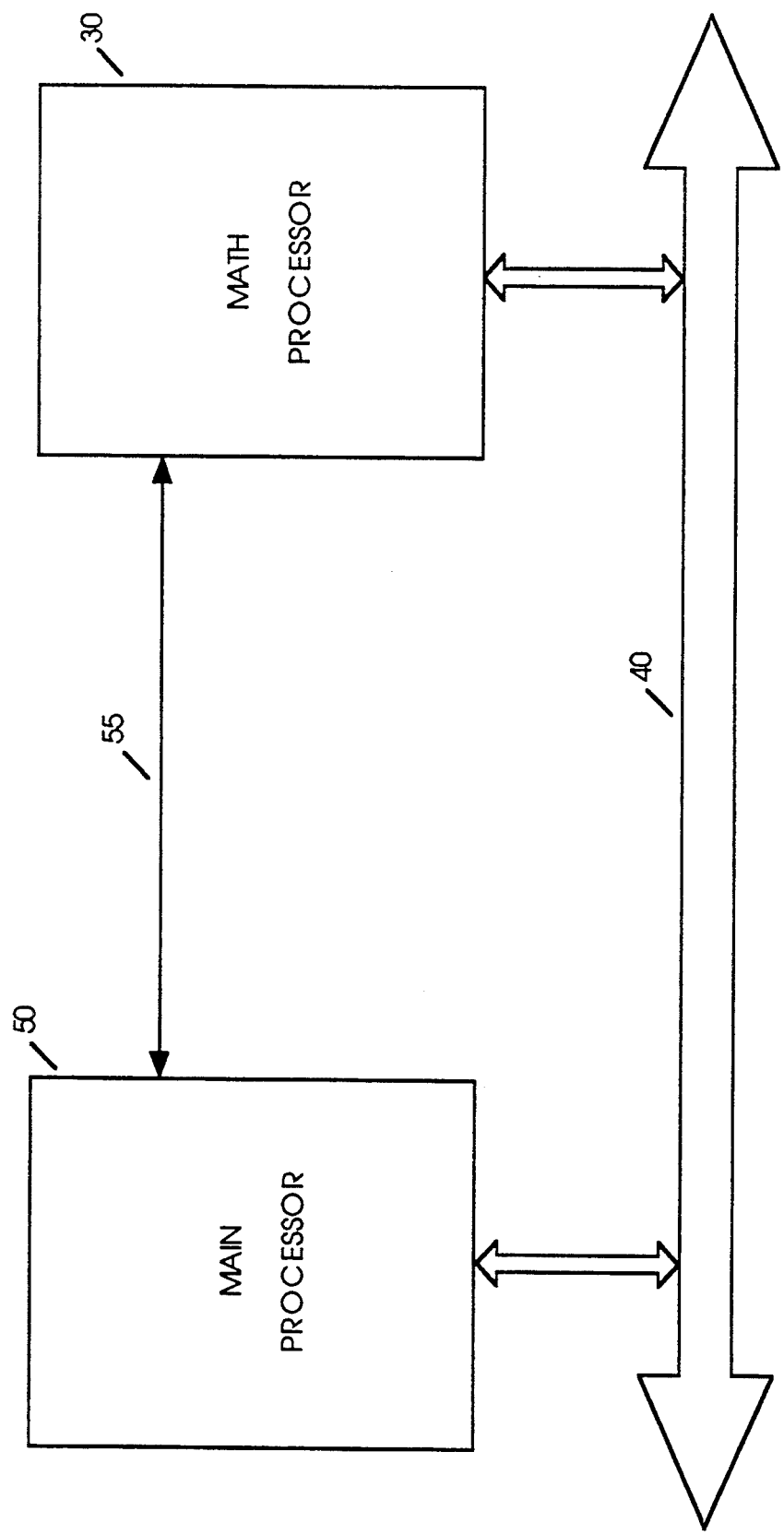
FIG. 1 is a block diagram of a computer system illustrating communication between a main processor and a math processor.

Referring now to FIG. 1, a computer system comprising a main processor and a math processor is illustrated. A main processor 50 and a math processor 30 are coupled to transfer information over a common bus 40. In this arrangement, the main processor 50 transfers math instructions over a control bus 55 and arguments to the math processor 30 over the bus 40. The results of math operations are transferred from the math processor 30 to the main processor 50, also over the common bus 40. Control bus 55 provides for synchronization and control of communication between the math processor 30 and the main processor 50.

The math processor 30 receives arguments from main processor 50 over the bus 40. The arguments may include two floating point numbers X and Y. A wide variety of inter-processor communication structures may be used for transferring instructions, arguments, and results between the main processor 50 and the math processor 30. Possible inter-processor communication structures include stacks and data cues, which may be located internal to the main processor 50 and the math processor 30, or located in an external memory.

In floating point representation, a computer word defining a number is divided into three fields, a sign field, an exponent field, and a mantissa field. The sign field determines whether the number is positive or negative, the exponent field determines the magnitude of the number, and the mantissa field determines the fractional part of the number. For one embodiment, the remainder generator of the present invention supports single, double, and double extended precision.

Figure 2:
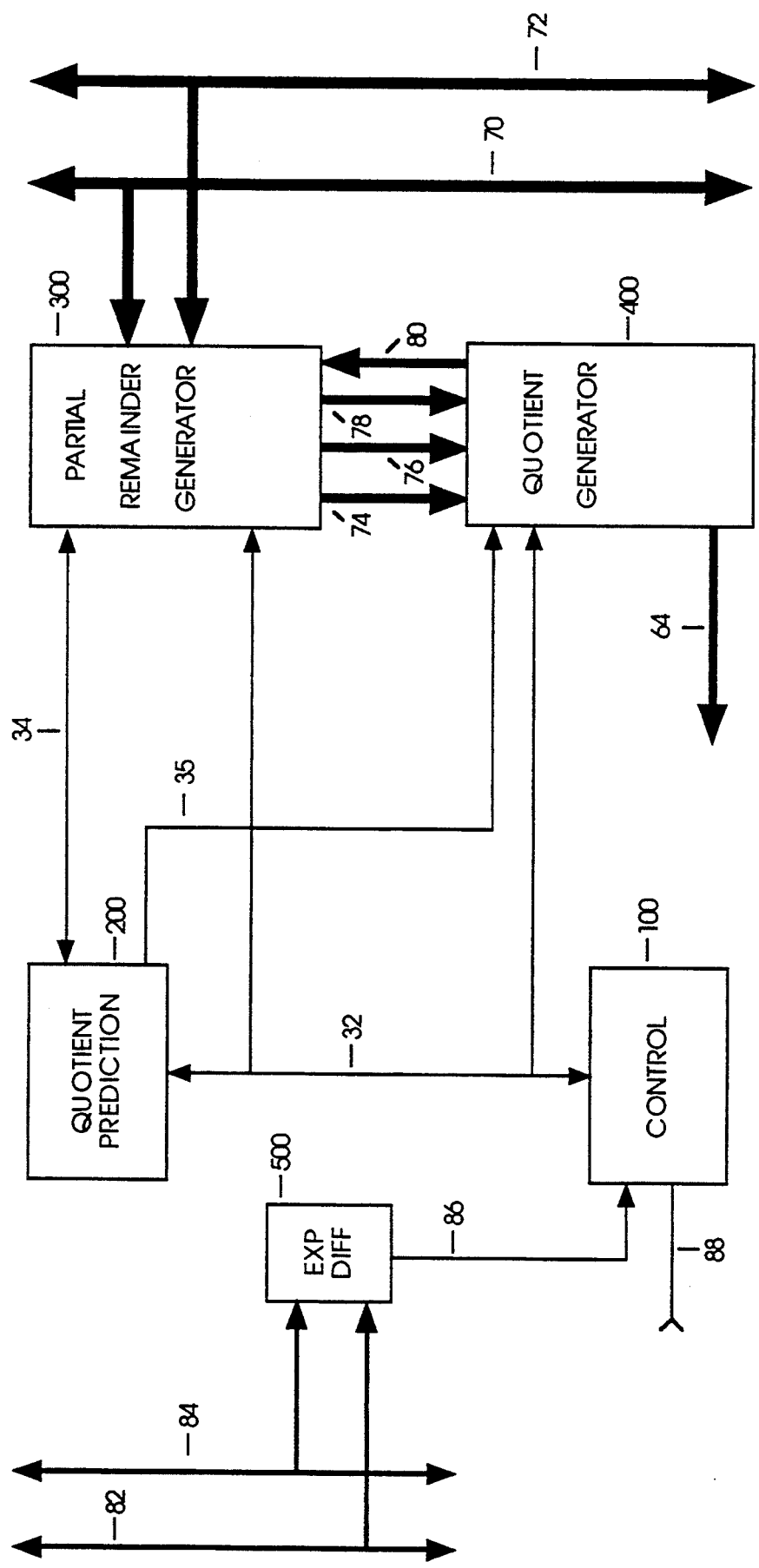
FIG. 2 is a block diagram of a divider circuit which is contained within the math processor.

FIG. 2 is a block diagram of a remainder generator portion of the math processor 30. The remainder generator is comprised of a control circuit 100, a quotient prediction circuit 200, a partial remainder generator circuit 300, a quotient generator circuit 400, and an exponent difference circuit 500. The exponent difference circuit 500 receives the exponent fields of floating point numbers X and Y over buses 82 and 84. The exponent difference circuit 500 subtracts the exponent of Y from the exponent of X, and delivers the result to the control circuit 100 over signal lines 86.

The control circuit 100 receives control signals 88 indicating that a remainder function is being executed by math processor 30. The control circuit 100 receives exponent difference 86 and determines parameters for performing the remainder function. The control circuit 100 then generates control signals 32 in order to control the flow of data through the quotient prediction circuit 200, the partial remainder generator circuit 300, and the quotient generator circuit 400. A wide variety of state machine designs may be used to implement the function of control circuit 100, without departing from the spirit of the present invention.

Partial remainder generator circuit 300 receives the mantissa field of floating point number X over signal lines 70, and receives the mantissa field of floating point number Y over signal lines 72. Partial remainder generator circuit 300 generates a partial remainder for non-restoring division, and restoring division.

Figure 3:
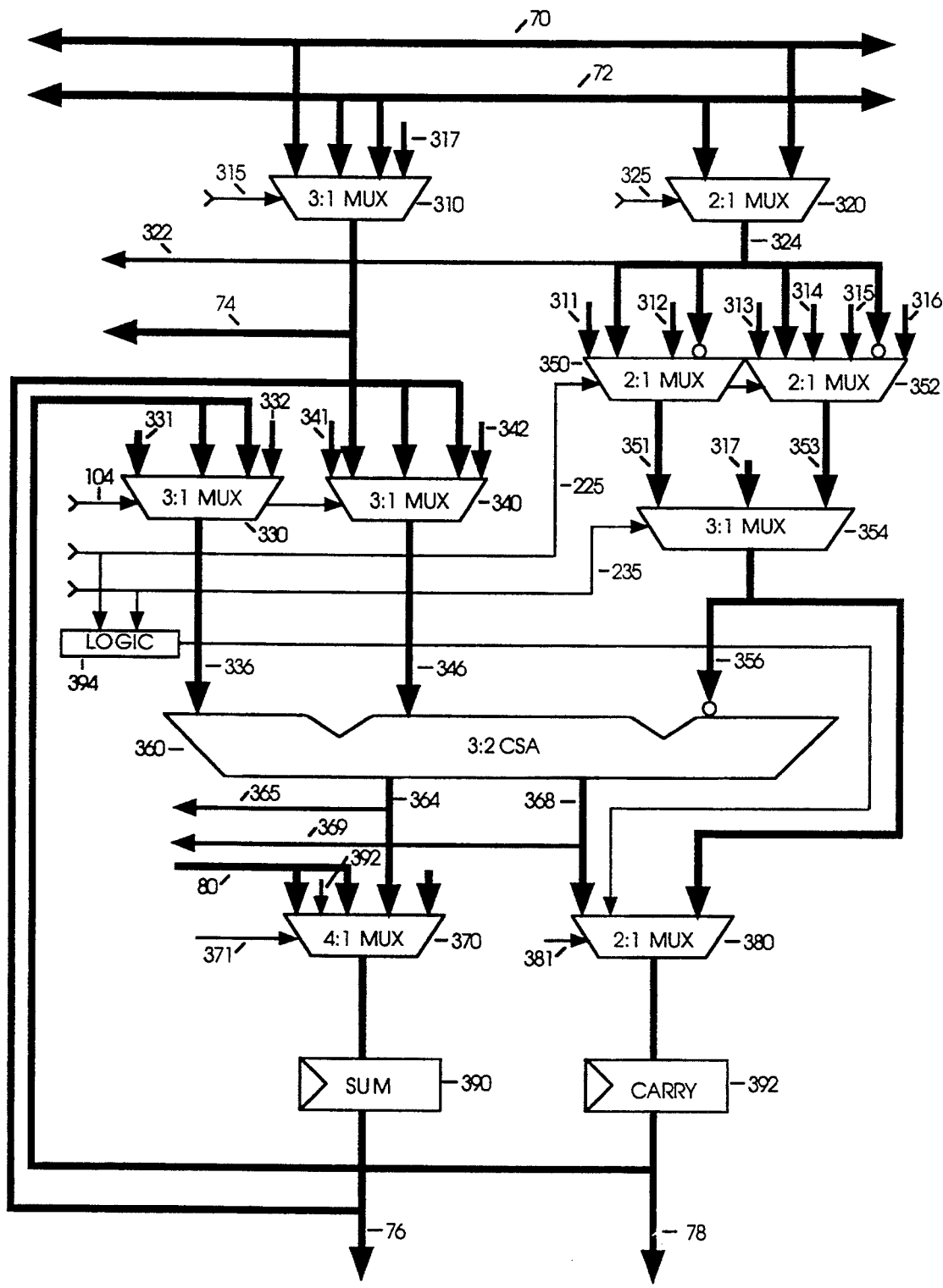
FIG. 3 is an illustration of a partial remainder generator circuit, which implements the teachings of the present invention.

FIG. 3 illustrates partial remainder generator circuit 300, which generates a redundant partial remainder. The redundant partial remainder is generated by carry save adder (CSA) 360 and stored in sum register 390 and carry register 392. Sum 76 and carry 78 are fed back to input 346 and input 336 of CSA 360 through multiplexers 340 and 330.

Multiplexers 310 and 320 receive the mantissa fields of floating point numbers X and Y from main processor 50 over busses 70 and 72. In the current embodiment, either bus 70 or 72 may carry the mantissa of X, with the other carrying the mantissa of Y. Control signals 315 and 325 received from control circuit 100 cause multiplexers 310 and 320 to selectively couple the mantissa of X to dividend 74, and the mantissa of Y to divisor 324. In the current embodiment, busses 70 and 72 are each 68 bits wide. Multiplexers 350, 352 and 354 generate adder input 356 equal to next quotient 235 (received from quotient prediction circuit 200) times divisor 324.

CSA 360 is a 3:2 carry save adder that performs subtraction in accordance with the teachings of the present invention. However, for purposes of illustration, the teachings of the present invention are discussed with reference to FIG. 4.

Figure 4:
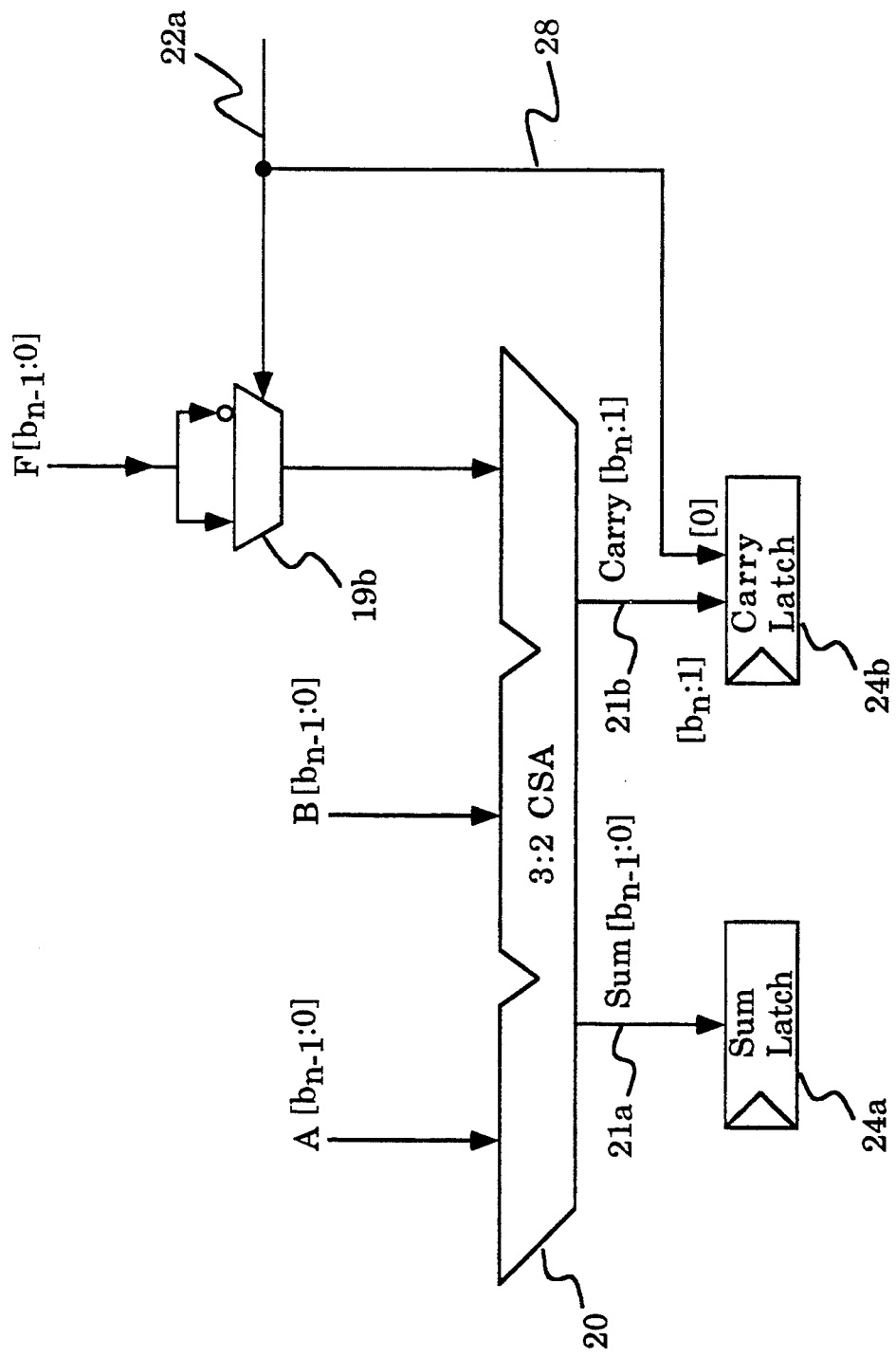
FIG. 4 is one embodiment of the present invention, wherein subtraction is implemented by a 3:2 CSA using forward looking carry-in signal after addition of a 2's complement datavalue.

In FIG. 4, a 3:2 CSA 20 receives three datavalues A, B, and F, having data formats of the form $[b_{n-1}:0]$. Datavalue F is transmitted to CSA 20 via a 1's complement generator block 19, in the preferred embodiment comprising an inverter and a 2:1 MUX. 1's complement generator block 19 has inverting logic necessary to produce the correct sign of datavalue F at the input of CSA 20, and receives a control signal 22a. Control signal 22a may be supplied either by a state machine controlling the digital logic implementation, or by a separate controlling (not shown) hardware arrangement. CSA 20 has two outputs respectively producing a sum vector 21a and a carry vector 21b. The sum vector 21a has a data format of $[b_{n-1}:0]$, which result is then steered to and stored in a sum vector latch 24a. With respect to the carry vector 21b, the least significant bit of the carry vector 21b is disregarded, with the data format of the output carry vector 21b being of the form $[b_n:1]$ the purpose of the different data format for carry vector 21b will become clear in the following paragraphs. The carry vector 21b is then steered to and latched in a carry vector latch 24b, similar to the case of sum vector 21a.

All three inputs to CSA 20 consist of operands to be combined as required, without allocating an additional input for a constant "1" to be added. Therefore, there are no additional input paths to CSA 20 beyond the three inputs shown in FIG. 4. Instead, a constant "1" signal 28 is taken from control signal 22a and routed to carry vector latch 24b. The signal 28 provides a constant "1", in essence, if asserted (or a constant "0" if deasserted) as shown in FIG. 4, which gates a datavalue equal to logical 1 to the LSB position of carry vector latch 24b whenever a subtraction operation is to be performed. The significance of the present invention is that rather than adding "1" at input of CSA 20, the constant "1" is added after operands have been combined in CSA 20, the foregoing being accomplished by "inserting" the "1" into the least significant bit (LSB) position of the output carry vector 21b taken from CSA 20. Inasmuch as the output carry vector 21b is defined to have a data format $[b_n:1]$, there remains an additional bit location which may be adjusted, namely the LSB.

In the present invention, the LSB position of carry vector 21b is used as the carry-in "input" for CSA 20, depending whether the carry-in signal 28 is asserted. In the case where carry-in signal 28 is not asserted, the LSB of the output carry vector 21b remains unaltered (logic 0), and no addition is accomplished to the LSB position of carry vector latch 24b. The final result will be formed from "Sum", representing the final sum vector 21a produced by CSA 20 and "Carry", representing the final carry vector 21b. On the other hand, if constant "1" signal 28 is asserted, latch 24b will capture the constant "1" to the LSB position of carry vector latch 24b, where the LSB of output carry vector 21b will be set to logical 1, and thereby adding "1". In the latter case, the result latched in latch 24b is a final carry vector "Carry" having again a full data format of $[b_n:0]$. As shown in FIG. 4, the final results taken from CSA 20 and stored as Sum and Carry in latches 24a and 24b respectively, may be subsequently taken and combined to form a single nonredundant representation of a final result. Obviously, in other specific implementations, carry-in signal 28 could be asserted when no addition is to occur, and deasserted when "1" is to be added, depending on the designer's preference.

The operation of the present invention may be best explained in connection with the following example. For purposes of the following example, four-bit data values will be used for explaining operation of the circuit. However, it should be obvious that the actual data format anticipated by the present invention may encompass any arbitrary size data value. In the presently preferred embodiment of the present invention, the operands consist of 70-bit data segments (i.e., data format is [69:0]. Assume for purposes of the following example that three binary values are to be combined:
A=1011,
B=0110,
and
F=0101.

Assume further that it is desired to perform the operation $A+B-F$. As previously described in the art background, because subtraction operations are difficult to implement, subtraction is almost always invoked by addition of the 2's complement representation of the number to be subtracted. Datavalue F (equal to 0101) has a 2's complement representation of $F^*=1011$. Accordingly, the operation $A+B-F$ to be performed may be restated as $A+B+F^*$.

The 3:2 CSA configured according to the present invention adds "1" after the addition has already taken place. Using the same binary data values for A, B, and F, inputs of CSA 20 of the present invention shown in FIG. 4, the problem is illustrated in FIG. 5.

As can be seen in FIG. 5, the effect of the present invention is to obviate the need for a dedicated fourth adder input in order to form the 2's complement in CSA 20. Rather, the present invention permits the constant "1" to be added after the addition of a 1's complement to two other datavalues, thereby adding 1 and forming the 2's complement after the addition has already occurred.

A principle benefit of the present invention is that the result is available sooner, and the margin with which results are delivered to subsequent logic blocks is increased. Consequently, the speed of subsequent operations using the result is enhanced. Another benefit of the present invention is that the smaller layout area required for a 3:2 CSA results in a dimensionally smaller overall FPU. Obviously, the 3:2 CSA 20 can be used for a three input adder in a straightforward manner, by not asserting the constant "1" signal 28, thereby causing all three input datavalues A, B, and F, to be added.

The foregoing has described a digital logic design implementing subtraction with a 3:2 CSA in a high speed floating point unit FPU is disclosed. It is contemplated that changes and modifications may be made by one of ordinary skill in the art, to the device components and arrangements of elements of the present invention without departing from the spirit and scope of the invention.

We claim:
1. A circuit for subtraction in a computer system, comprising:
  circuit for generating a one's complement value of a first datavalue;
  carry-save adder receiving said one's complement value and a set of input datavalues, said carry-save adder generating a first result in a redundant form comprising a sum vector and a first carry vector by adding said one's complement value and said input datavalues;
  first register coupled to receive said sum vector; and
  second register coupled to receive said first carry vector, said second register generating a second carry vector by incrementing said first carry vector by one such that said sum vector and said second carry vector represent in said redundant form a second result equal to a sum of said input datavalues minus said first datavalue.

2. The circuit of claim 1 wherein said input datavalues and said first datavalue each comprise a first number of bits, and said first carry vector comprises a second number of bits such that said second number is greater than said first number by one.

3. The circuit of claim 2 wherein said second register increments said first carry vector by setting a least significant bit of said first carry vector to one.

4. The circuit of claim 3 wherein said circuit for generating a one's complement value comprises an inverter.

5. The circuit of claim 4 wherein said input datavalues comprise a pair of input datavalues and said carry-save adder is a 3:2 carry-save adder.

6. In a computer system, a method of performing subtraction, comprising:
generating a one's complement value of a first datavalue;
adding said one's complement value and a set of input datavalues in a carry-save adder to generate a first result in a redundant form comprising a sum vector and a first carry vector;
storing said sum vector in a first register;
storing said first carry vector in a second register;
generating a second carry vector by incrementing said first carry vector by one such that said sum vector and said second carry vector represent in said redundant form a second result equal to a sum of said input datavalues minus said first datavalue.

7. The method of claim 6 wherein said first carry vector comprises one bit more than a number of bits in each of said input datavalues and said first datavalue.

8. The method of claim 7 wherein said step of generating a second carry vector comprises the step of generating said second carry vector by setting a least significant bit of said first carry vector to one.

9. The method of claim 8 wherein said step of generating one's complement value comprises the step of inverting each bit of said first datavalue.

10. The method of claim 9 wherein said input datavalues comprise a pair of input datavalues and said carry-save adder is a 3:2 carry-save adder.

11. A computer system that selectively provides for addition or subtraction, comprising:

indication means for generating a first signal value if a first datavalue is to be subtracted from a sum of a set of input datavalues;
circuit for generating a one's complement value of said first datavalue;
multiplexer means coupled to receive said one's complement value and said first datavalue, said multiplexer means generating an output by selecting said one's complement value if said indication means generates said first signal value;
carry-save adder coupled to receive said output and said input datavalues, said carry-save adder generating a first result in a redundant form comprising a sum vector and a first carry vector by adding said output and said input datavalues;
first register coupled to receive said sum vector; and
second register coupled to receive said first carry vector, said second register generating a second carry vector by incrementing said first carry vector by one if said indication means generates said first signal value, said sum vector and said second carry vector representing in said redundant form a second result equal to said sum minus said first datavalue.

12. The computer system of claim 11 wherein:
said indication means generates a second signal value if said first datavalue is to be added to said first sum;
said multiplexer means generates said output by selecting said first datavalue if said indication means generates said second signal value;
whereby said first result equals an addition result of said first datavalue and said input datavalues.

13. The circuit of claim 12 wherein said input datavalues and said first datavalue each comprise a first number of bits, and said first carry vector comprises a second number of bits such that said second number is greater than said first number by one.

14. The circuit of claim 13 wherein said second register increments said first carry vector by setting a least significant bit of said first carry vector to one.

15. The circuit of claim 14 wherein said circuit for generating a one's complement value comprises an inverter.

16. The circuit of claim 15 wherein said input datavalues comprise a pair of input datavalues and said carry-save adder is a 3:2 carry-save adder.

* * * * *